US010836236B2

(12) United States Patent
Larson et al.

(10) Patent No.: US 10,836,236 B2
(45) Date of Patent: Nov. 17, 2020

(54) VEHICLE ENGINE-OFF HEATING AND COOLING CLIMATE CONTROL USING SUPER-HEATED FLUID FOR HEATING

(71) Applicant: International Truck Intellectual Property Company, LLC, Lisle, IL (US)

(72) Inventors: Gerald L. Larson, Grand Haven, MI (US); Dean Oppermann, Plainfield, IL (US)

(73) Assignee: International Truck Intellectual Property Company LLC, Lisle, IL (US)

( * ) Notice: Subject to any disclaimer, the term of this patent is extended or adjusted under 35 U.S.C. 154(b) by 199 days.

(21) Appl. No.: 16/203,028

(22) Filed: Nov. 28, 2018

(65) Prior Publication Data

US 2019/0168576 A1    Jun. 6, 2019

Related U.S. Application Data

(66) Substitute for application No. 62/609,526, filed on Dec. 22, 2017, Substitute for application No. 62/593,514, filed on Dec. 1, 2017.

(Continued)

(51) Int. Cl.
*B60H 1/22*    (2006.01)
*B60H 1/00*    (2006.01)
*B60H 1/32*    (2006.01)

(52) U.S. Cl.
CPC ....... *B60H 1/2221* (2013.01); *B60H 1/00321* (2013.01); *B60H 1/00428* (2013.01);
(Continued)

(58) Field of Classification Search
CPC .............. B60H 1/2221; B60H 1/00321; B60H 1/00428; B60H 1/00885; B60H 1/2215; B60H 1/00899; B60H 1/3213; B60H 2001/00942; B60H 2001/00949; B60H 2001/00957; B60H 2001/2228; B60H 2001/2271
(Continued)

(56) References Cited

U.S. PATENT DOCUMENTS

| 4,373,577 | A | 2/1983 | McMillen |
| 4,924,838 | A | 5/1990 | McCandless |
| 2016/0250956 | A1* | 9/2016 | Seiting ................. B60N 2/5657 297/180.14 |

* cited by examiner

*Primary Examiner* — Gertrude Arthur Jeanglaude
(74) *Attorney, Agent, or Firm* — Jeffrey P. Calfa; Mark C. Bach (57) ABSTRACT

A vehicle has a climate control system using a heat pump having a condenser heat exchanger that exchanges heat between refrigerant and working fluid within a hot fluid chamber, and an evaporator heat exchanger that exchanges heat between refrigerant and working fluid within a cold fluid chamber. A super-heated fluid pressure vessel may be in fluid communication with the cold fluid chamber by way of a heat exchanger and an electrically controlled variable delivery valve, and has an electric heater that may be powered by a drivetrain battery or by a shore power source. The hot fluid chamber provides heat to at least one cabin heat exchanger and to at least one ambient air heat exchanger. The cold fluid chamber is connected to at least one vehicle interior cooling module, to a waste heat source, and to a cold fluid chamber to outside heat exchanger.

20 Claims, 4 Drawing Sheets

Related U.S. Application Data

(60) Provisional application No. 62/623,884, filed on Jan. 30, 2018.

(52) U.S. Cl.
CPC ..... B60H 1/00885 (2013.01); B60H 1/00899 (2013.01); B60H 1/2215 (2013.01); B60H 1/3213 (2013.01); B60H 2001/00942 (2013.01); B60H 2001/00949 (2013.01); B60H 2001/00957 (2013.01); B60H 2001/2228 (2013.01); B60H 2001/2271 (2013.01)

(58) Field of Classification Search
USPC .......................................................... 701/36
See application file for complete search history.

VEHICLE ENGINE-OFF HEATING AND COOLING CLIMATE CONTROL USING SUPER-HEATED FLUID FOR HEATING

BACKGROUND

This disclosure relates to commercial vehicles, recreational vehicles, electric vehicles, hybrid electric vehicles, and similar vehicles in which occupant compartment climate control may be desired for extended times during which the vehicle engine may be inactive. In particular, it relates to a climate control system arrangement and method utilizing super-heated fluid and a heat pump for such vehicles.

RELATED ART

Commercial vehicle operators have a considerable financial incentive to maximize the number of miles driven during a given 24-hour period. Yet commercial vehicles are large and heavy, and require particular attention by the operator in order to ensure safe operation. In order to prevent operators from driving for an excessive period of time and thereby becoming tired or drowsy, commercial vehicle operators are required to rest for a certain number of hours during a given period of time. Therefore, commercial vehicles such as Class 8 over the road trucks and highway tractors are often provided with accommodations such as a sleeper cab so that the driver can rest between hours of service. These accommodations require heating and cooling for the operator's safety and comfort. Similarly, recreational vehicles are often occupied for extended periods without the engine running, and also require heating and cooling for occupant comfort. Additionally, vehicles having very large internal spaces that need to be heated for occupancy, such as school buses, do not provide sufficient heat via engine coolant alone to fully heat the internal space. This may be exacerbated by school bus drive cycles, and may result in compensation by operators through extended idling in order to warm the vehicle interior and clear fogged windows. Historically, operators of commercial vehicles allowed the vehicle engine to idle during rest hours, in order to provide heat and air conditioning. However, many laws and regulations have been enacted limiting the amount of time that vehicles may be allowed to idle. As a result, many manufacturers of Class 8 commercial vehicles use an all-electric or small diesel Auxiliary Power Unit (APU) to provide heat and air conditioning. Many manufacturers of recreational vehicles also use an auxiliary power source to provide heat and air conditioning when the vehicle is not plugged in or running. Manufacturers of school buses also utilize auxiliary heaters in order to mitigate the problem of insufficient heat.

Full electric and hybrid electric vehicles have a similar problem. Because the propulsion system of a full electric wheeled vehicle lacks an internal combustion engine, and therefore also lacks an engine cooling system through which liquid coolant circulates, hot liquid coolant is unavailable for heating the interior of the cabin, cab, or passenger compartment. Similarly, the propulsion system of a hybrid electric wheeled vehicle may operate for significant periods of time without operation of the internal combustion engine, so that insufficient heat is provided by the circulating liquid coolant of the engine coolant system for heating the interior of the cabin, cab, or passenger compartment. Nevertheless, heating of the cabin, cab, or passenger compartment is necessary, not only for the comfort of the occupants, but also for the purpose of defrosting the vehicle windows. Additionally, air conditioning in conventional non-electric vehicles is generally provided by an air conditioning compressor that is mechanically driven by the internal combustion engine. Because a full electric wheeled vehicle lacks an internal combustion engine, and because the internal combustion engine of a hybrid electric vehicle may be turned off for significant periods of time, it is necessary to provide an alternate source of cooling for the cab, cabin, or passenger compartment for such vehicles when air conditioning is desired.

Electric heaters used to heat the cab, cabin, or passenger compartment of full electric or hybrid electric vehicles typically draw electric current from the same on-board source of electricity that supplies current to the traction motor that propels the vehicle. Similarly, any electrically operated alternate source of cooling for the cab, cabin, or passenger compartment of a full electric or hybrid electric vehicle also typically draws electric current from the same on-board source of electricity that supplies current to the traction motor that propels the vehicle. Therefore, heating and cooling of the cab, cabin, or passenger compartment of a full electric or hybrid electric vehicle, including defrosting of the vehicle windows, is accomplished at the expense of limiting the vehicle's range of travel under electric power, due to the finite quantity of electrical energy that is stored in the on-board source of electricity.

One known solution for commercial vehicles is a dedicated all-electric air conditioning APU. When providing air conditioning, dedicated all-electric air conditioning APU's of commercial vehicles are typically rated at approximately 6000 BTU per hour. This may be sufficient for driver comfort in many geographic locations for a ten-hour driver rest period. Yet, engine-off heating may require significantly higher BTU levels. Specifically, air conditioning units operate with differential air temperatures, or differences between outside air temperature and cabin target temperature, in the range of 30 degrees Fahrenheit. When providing heat, however, the differential temperatures can exceed 65 degrees Fahrenheit. Consequently, energy needs for heating are at least twice the capacity as compared to energy needs for cooling. Due to the higher energy requirements, current technology engine-off heating systems are typically reliant upon diesel fuel fired catalytic heaters. For example, a 7000 BTU diesel fuel fired catalytic heater may be used for truck sleeper applications, or a 14,000 BTU hydronic fuel fired catalytic heater may be used for truck sleeper and engine heating applications.

As an alternative for commercial vehicles, for example, Positive Temperature Coefficient (PTC) electric heaters provide a very limited capability for engine-off heating applications. To illustrate, a sleeper cab having a volume of 400 cubic feet may require six air exchanges per hour, or 40 cubic feet per minute. At this rate, the required energy for a PTC electric heater is in the range of 12 Kilowatt-hours to maintain a sleeper temperature of 65 degrees Fahrenheit for a ten-hour rest period in a zero-degree ambient Outside Air Temperature (OAT) environment. If a dedicated all-electric APU is being used, the battery system would require eighteen Group 31 AGM batteries with a weight of approximately 1600 pounds in order to provide the needed 12 Kilowatt hours. Such a large bank of batteries is not only prohibitively heavy, but also prohibitively expensive.

Heat pumps are known to be a much more effective means of providing heat since existing heat is moved from one location to another by an energy transfer pumping method. Conventional air-sourced heat pumps move heat from the outside air environment to the cabin interior by means of a compressor condenser evaporator system, wherein the condenser is located within the cabin, and the evaporator is exposed to outside air. This allows the conventional air-sourced heat pump to transfer heat energy from the outside air to the cabin interior. In other words, when operating in heating mode the evaporator draws heat directly from the ambient air and the condenser rejects heat directly to the heated inside air. When operating in cooling mode, the evaporator draws heat directly from the conditioned inside air and the condenser rejects heat directly to the ambient air. A conventional air-sourced heat pump of this type may deliver 10 Kilowatt Hours of heating using an input energy level in the range of 2.5 to 3.0 Kilowatt Hours, resulting in the possibility of using a battery of practical size. For air conditioning, the condenser and evaporator locations are reversed via solenoid valves, so that the condenser is located outside, and the evaporator is located in the cabin interior.

The ratio of heat delivered to input energy is defined as the Coefficient of Performance (COP). For the preceding example the COP is in the range of 3 to 4, as compared to the COP for a PTC electric heater with a COP of 1.0. However, an air sourced heat pump has two significant disadvantages when operated for heating. First, frost and icing will form on the evaporator, which necessitates periodic defrosting. This is often accomplished by directly heating the evaporator, which is a significant efficiency loss. Second, the COP of an air sourced heat pump decreases with decreasing air temperatures, with the COP decreasing to approximately 1.0 when the outside temperature drops to the 0-20 degree Fahrenheit range. That is to say, in a conventional heat pump arrangement, such as for example a residential heat pump arrangement as referenced previously, when the evaporator temperature falls far enough, the refrigerant approaches its evaporation temperature, reducing the efficiency of the system. Typically, supplementary PTC electric heat is needed with an air sourced heat pump at lower OATs, as described in "*Air Source Heat Pump Efficiency Gains from Low Ambient Temperature Operation Using Supplemental Electric Heating, Final Study Report*," Mark Brown, Max Burke-Scoll, Jim Stebnicki, Minnesota Division of Energy Resources, Minnesota Department of Commerce, prepared by Franklin Energy, 2011, which is hereby incorporated by reference in its entirety.

Accordingly, there is an unmet need for a system and method for providing energy efficient heating and cooling of the cabin, cab, or passenger compartment of a commercial vehicle, RV, or school bus in the engine-off or insufficient available heat condition, and/or a full electric or hybrid electric wheeled vehicle, in order to conserve electric power within the on-board source of electricity and extend the range of travel of the full electric or hybrid electric wheeled vehicle, and/or to provide engine-off heating and cooling in a commercial vehicle, RV, or school bus.

SUMMARY

According to one embodiment of the Vehicle Engine-Off Heating and Cooling Climate Control using Super-Heated Fluid for Heating, a vehicle has a climate control system. The climate control system includes a super-heated fluid pressure vessel with an electric heating element located within the super-heated fluid pressure vessel. At least one heat exchanger is in fluid communication with the super-heated fluid pressure vessel. An electrically controlled variable delivery valve is configured to control the flow of super-heated fluid from the super-heated fluid pressure vessel to the at least one heat exchanger. A super-heated fluid return reservoir is in fluid communication with the at least one heat exchanger and with the super-heated fluid pressure vessel. A positive displacement pump is configured to pump fluid from the super-heated fluid return reservoir to the super-heated fluid pressure vessel.

According to another embodiment of the Vehicle Engine-Off Heating and Cooling Climate Control using Super-Heated Fluid for Heating, a climate control system of a vehicle includes a super-heated fluid pressure vessel with an electric heating element located within the super-heated fluid pressure vessel. At least one heat exchanger is in fluid communication with the super-heated fluid pressure vessel. An electrically controlled variable delivery valve is configured to control the flow of super-heated fluid from the super-heated fluid pressure vessel to the at least one heat exchanger. A super-heated fluid return reservoir is in fluid communication with the at least one heat exchanger and with the super-heated fluid pressure vessel. A positive displacement pump is configured to pump fluid from the super-heated fluid return reservoir to the super-heated fluid pressure vessel.

According to another embodiment of the Vehicle Engine-Off Heating and Cooling Climate Control using Super-Heated Fluid for Heating, a method of providing climate control in an occupant compartment of a vehicle includes several steps for selectively heating the occupant compartment. The first step is super-heating fluid in a pressure vessel using an electric heating element. The second step is exchanging heat between the super-heated fluid and working fluid in a cold fluid chamber. The third step is pumping heat from the working fluid in the cold fluid chamber to working fluid in a hot fluid chamber. The fourth step is circulating the working fluid between the hot fluid chamber and at least one cabin heat exchanger.

DETAILED DESCRIPTION

Embodiments described herein relate to a Vehicle Engine-Off Heating and Cooling Climate Control using Super-Heated Fluid for Heating and methods for the use thereof. The system and method may be applied to various types of commercial vehicles, recreational vehicles, large occupancy vehicles such as school buses, and/or electric or hybrid electric vehicles, such as highway or semi-tractors, straight trucks, busses, fire trucks, agricultural vehicles, motorhomes, rail travelling vehicles, and etcetera. The several embodiments of the Vehicle Engine-Off Heating and Cooling Climate Control using Super-Heated Fluid for Heating and method for the use thereof presented herein are employed on vehicles having an electric, hybrid electric, diesel, or gas engine drivetrain, but this is not to be construed as limiting the scope of the system and method, which may be applied to vehicles and engines of differing construction.

In at least one embodiment, this disclosure introduces a climate control system for the interior of a cabin of a wheeled vehicle that is propelled at least in part by an electric traction motor that draws electricity from an on-board source of electricity. In at least one other embodiment, this disclosure introduces a climate control system for the interior of a cabin of a wheeled vehicle, such as a commercial vehicle or RV, that may be used during times of engine-off operation. The climate control system may or may not include a heat pump that can provide both heating and cooling of the cabin interior. If a heat pump is used, when the heat pump operates, a refrigerant compressor draws evaporated refrigerant from an outlet of a cold side heat exchanger and compresses the refrigerant to force liquid refrigerant to flow through a hot side heat exchanger, in order to reject heat, and thereafter to an inlet of an expansion valve. An outlet of the expansion valve is open to an inlet of a cold side heat exchanger to allow the refrigerant to expand and boil, in order to absorb heat as it passes through the cold side heat exchanger. The refrigerant then exits to complete the refrigerant circuit back to refrigerant compressor. This creates a temperature difference between the hot side heat exchanger and the cold side heat exchanger.

The heating efficiency of a heat pump is significantly greater than that of an electric heater, and its cooling efficiency is significantly greater than that of the typical air conditioning system of a vehicle propelled by a fuel burning prime mover, as noted previously. For example, current air-sourced heat pump technology can provide a COP (coefficient of performance) in the range of about 3.5, meaning that for one watt of energy input, the heat pump can provide about 3.5 watts of heat output for heating and a similar cooling output for cooling. Heat pump performance can also be characterized by an EER (energy efficiency rating), calculated by dividing the BTU heating or cooling output by the power input in watts.

When used for heating, the COP of an air-sourced heat pump decreases as the outside temperature decreases. For example, when the air-sourced heat pump is being used for heating, and the ambient temperature is 70 degrees Fahrenheit, the COP of the heat pump may be in the range of 4.0. As the ambient temperature decreases, the COP of the air-sourced heat pump decreases in a linear relationship. When the ambient temperature is about zero degrees Fahrenheit, the COP of the air-sourced heat pump may be no greater than that achievable using resistive heating. At zero degrees Fahrenheit, the ambient temperature is nearly at the boiling point of the refrigerant, so that gaseous refrigerant is being produced at low volume and pressure, causing the drop in efficiency at the heat pump and reduced overall system efficiency. Nevertheless, sufficient refrigerant boiling to increase efficiency over resistive heating occurs at about 10 degrees Fahrenheit.

By adding heat to the system using super-heated fluid, the Vehicle Engine-Off Heating and Cooling Climate Control using Super-Heated Fluid for Heating and methods for the use thereof disclosed herein raises the COP of the heat pump under low temperature conditions. For example, using a PTC heater in conjunction with super-heated fluid, the system and method sacrifices a COP of 1, but obtains a heat pump COP of 2.5, instead of the COP of 1 attainable using the PTC heater alone. In other words, in this example, the system and method expends 1 watt in order to get 2.5 watts of heating. This may be accomplished by heating a working fluid, as will be explained further. This further allows for stabilizing the COP of the heat pump, thereby enabling the selection of a heat pump compressor of more efficient size. Alternately, the super-heated fluid may be used to directly transfer heat to the vehicle interior.

Super-heated fluid is capable of storing and releasing very high energy thermal energy levels. In practice, super-heating of a fluid is achieved by containing the fluid within a pressure vessel allowing a small portion of the vessel volume for an air space to accommodate fluid expansion. The fluid is then brought to a temperature and pressure level that is greater than atmospheric (or release) temperature. Super-heated temperatures and pressures are quantified by steam tables, as described in "Thermodynamic Properties of Steam," Joseph H. & Keyes, Frederick G. Keenan, John Wiley & Sons, first ed. 1964, which is hereby incorporated by reference in its entirety. The energy input to achieve super heating is the sum of energy needed to achieve vaporization (phase change) of the fluid (this is latent heat) plus the energy necessary to raise the temperature of the fluid (sensible heat). From the steam table, it is seen that the latent heat energy is very high as compared to sensible heat for a given temperature-pressure state. Hence, latent heat may be the primary energy source for storing and releasing energy for heating the interior of a vehicle.

As another example, the total energy content of five gallons of water at 287 degrees Fahrenheit under 40.3 PSIG pressure is 49,390 BTU, as compared with 33,684 BTU required to maintain a 68 degree Fahrenheit Class 8 commercial vehicle sleeper environment for ten hours in a 0 degree Fahrenheit ambient temperature environment. This is also sufficient heat to maintain an engine-off cab temperature for a Class 6 vehicle for approximately one hour. In practice, approximately 70% of the energy content of the super-heated water is recoverable for heating a vehicle cab or sleeper. Consequently, large storage containers are not needed, and system weight is reasonable, as five gallons of water weighs approximately 40 pounds. Naturally, a vehicle with a large volume of space to be heated, such as a school bus, may require a ten gallon or larger reservoir of super-heated fluid.

A storage vessel containing super-heated liquid requires energy input corresponding to the sensible heat of the liquid plus the latent heat of the liquid to achieve the super-heated condition for a given pressure. However, maintaining the superheated condition as heat is lost to the ambient environment requires only replacing sensible heat. Using the Steam Tables of Keyes and Keenan for super-heated water at 40 PSI, it is seen that the sensible heat is 256 BTU per pound degree Fahrenheit. For the example using five gallons of water at 287 degrees Fahrenheit, therefore, with a time constant for heat loss to the ambient environment of eight hours, the energy required to maintain the super-heated condition is only 3.0 Kilowatt-Hours. Consequently, use of super-heated liquid enables long duration cabin heating with a minimal battery capacity. The COP of a system that uses waste energy recovery to deliver super-heated liquid for the cited example is approximately 2.7.

Super-heated liquid may also be used with a liquid based heat pump, such as embodiments of the Vehicle Engine-Off Heating and Cooling Climate Control using Super-Heated Fluid for Heating, to maintain a relatively constant COP over a wide and cold ambient temperature range. The evaporator of a liquid based heat pump functions to acquire energy from an external thermal source, which for vehicle applications may be ambient air or engine coolant. For a liquid sourced heat pump using ambient air as a thermal energy source, as ambient air temperature decreases, the differential temperature of the refrigerant minus air temperature decreases, and the capacity (as well as COP) of the unit decreases. However, if heat energy from stored superheated fluid is added to the evaporator circuit, a large differential temperature may be maintained, thus preserving the COP of the unit while still transferring heat from the external ambient environment. In practice, the heat pump condenser will function to efficiently transfer the heat obtained from the super-heated fluid input as well as heat from the external environmental source.

In the several embodiments of the Vehicle Engine-Off Heating and Cooling Climate Control using Super-Heated Fluid for Heating and methods for the use thereof presented herein, therefore, each of the evaporator and the condenser is situated within a chamber having a working fluid such as water or alcohol. The chamber containing the evaporator becomes, therefore, the cold fluid chamber, and the chamber containing the condenser becomes the hot fluid chamber. This increases efficiency, with COPs in the range of 3 to 5 being possible. In addition, the liquid sourced heat pump of the Vehicle Engine-Off Heating and Cooling Climate Control using Super-Heated Fluid for Heating does not require defrost cycles, and COP becomes a function of liquid temperature rather than OAT.

In order to further raise the overall efficiency of the system when operating in a heating mode, the Vehicle Engine-Off Heating and Cooling Climate Control using Super-Heated Fluid for Heating and method for the use thereof disclosed herein may use several additional methods to raise the fluid temperature of the cold fluid chamber containing the evaporator. This may be accomplished using heat extracted from the ambient air, as noted previously. This may further be accomplished using waste heat, such as heat rejected by electronic and electro-mechanical components of the full electric or hybrid electric vehicle, for non-limiting example heat rejected by the electric drive motor and/or its power electronics. This may further be accomplished using heated engine coolant from the vehicle engine, if applicable. For Class-8 commercial vehicles, the use of a liquid sourced heat pump with input energy sourced from engine coolant supplemented with heat energy from super-heated liquid has an additional benefit. The heat pump system may additionally be configured for temperature controlled engine coolant returned to the vehicle engine, thus enabling improved engine starting following long duration engine-off situations.

For example, COP decreases linearly with decreasing temperature, so that a baseline COP may be 4.0 at 70 degrees Fahrenheit with a system capacity of 30,000 BTU per hour, and may be 1.0 at minus 20 degrees Fahrenheit. The driver of the vehicle delivers 100 Watts (340 BTU/Hour) of heat to the sleeper environment, and blower fans deliver 100 Watts (340 BTU/Hour) to the sleeper or cab environment. Heat demand in this instance is based upon 400 cubic feet of sleeper air volume with six air exchanges per hour. Under an ambient condition of 40 degrees Fahrenheit, an air sourced heat pump may have a COP of 2.8. For a 40,000 BTU/Hr (11.71 Kw) delivered capacity heat pump at 70 degrees Fahrenheit, at 40 degrees Fahrenheit the delivered capacity becomes 26,667 BTU/Hr and the power input is 2.79 Kw. If the compressor capacity is increased to bring the delivered output to 40,000 BTU/Hr at 70 degrees with an OAT of 40 degrees Fahrenheit, then the system electrical input must be increased to 4.19 Kw. However, if supplemental heat is added to the cold fluid chamber or evaporator reservoir using super-heated fluid, the total electrical input becomes 3.72 Kw and the COP of the system becomes 3.0. Consequently, for 40,000 BTU/Hr delivered under these conditions, the Vehicle Engine-Off Heating and Cooling Climate Control using Super-Heated Fluid for Heating uses 2S % less energy.

Furthermore, under an ambient condition of 20 degrees Fahrenheit, the system COP of an air sourced heat pump decreases to 1.87 requiring a power input of 2.78 Kw. To maintain 40,000 BTU/Hr at 20 degrees Fahrenheit, the compressor input of an air sourced heat pump must be increased to 6.25 Kw. However, if supplemental heat is added to the cold fluid chamber or evaporator reservoir using super-heated fluid, the total electrical input becomes 4.92 KW and the resulting system COP becomes 2.38. Consequently, for 40,000 BTU/Hr delivered under these conditions, the Vehicle Engine-Off Heating and Cooling Climate Control using Super-Heated Fluid for Heating uses 21% less energy.

Figure 1:
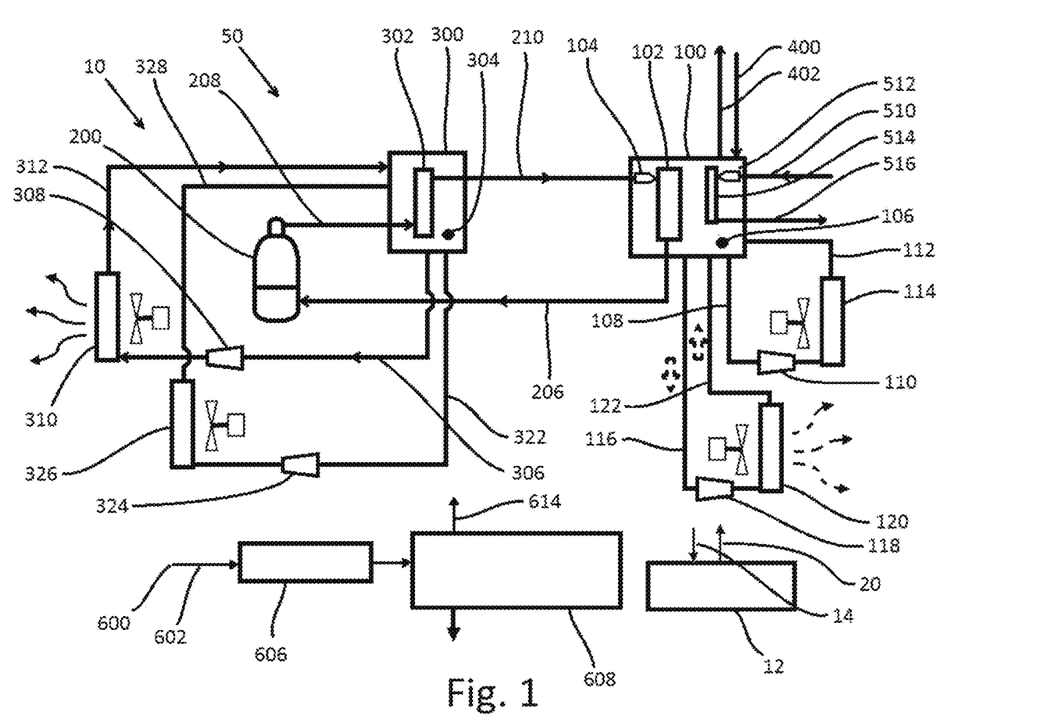
FIG. 1 is a graphical representation of an embodiment of a Vehicle Engine-Off Heating and Cooling Climate Control using Super-Heated Fluid for Heating, as described herein.

Referring now to FIG. 1, a graphical representation of the primary components of an embodiment of a Vehicle Engine-Off Heating and Cooling Climate Control using Super-Heated Fluid for Heating is shown. A vehicle (not shown) includes a climate control system 10 using a heat pump 50. The heat pump 50 includes a heat pump refrigerant compressor 200, a condenser heat exchanger 302, an expansion valve 104, and an evaporator heat exchanger 102. The heat pump refrigerant compressor 200 may be a 48-volt DC electric scroll compressor. The heat pump refrigerant compressor 200 discharges compressed gaseous refrigerant to the condenser heat exchanger 302 by way of a refrigerant discharge line 208. The compressed gaseous refrigerant condenses and rejects heat to the working fluid in a hot fluid chamber or condenser reservoir 300 using the condenser heat exchanger 302, and then proceeds to the expansion valve 104 by way of the refrigerant liquid line 210. After passing through the expansion valve 104, the refrigerant boils and absorbs heat from the working fluid in a cold fluid chamber or evaporator reservoir 100 using the evaporator heat exchanger 102, before returning to the heat pump refrigerant compressor 200 by way of the refrigerant suction line 206.

At least one cabin heat exchanger 310 is in fluid communication with the hot fluid chamber or condenser reservoir 300 by way of at least one hot fluid chamber to cabin heat exchanger line 306 and at least one cabin heat exchanger to hot fluid chamber return line 312. Working fluid may be selectively circulated between the hot fluid chamber or condenser reservoir 300 and the at least one cabin heat exchanger 310 using at least one hot fluid chamber to cabin heat exchanger pump 308. At least one outside heat exchanger 326 is also in fluid communication with the hot fluid chamber or condenser reservoir 300 by way of at least one hot fluid chamber to outside heat exchanger line 322 and at least one outside heat exchanger to hot fluid chamber return line 328. Working fluid may be selectively circulated between the hot fluid chamber or condenser reservoir 300 and the at least one outside heat exchanger 326 using a hot fluid chamber to outside heat exchanger pump 324.

At least one vehicle interior cooling module 114 may be in fluid communication with the cold fluid chamber or evaporator reservoir 100 by way of at least one cold fluid chamber to vehicle interior cooling modules line 108 and at least one vehicle interior cooling modules to cold fluid chamber return line 112. Working fluid may be selectively circulated between the cold fluid chamber or evaporator reservoir 100 and the at least one vehicle interior cooling module 114 using a cold fluid chamber to vehicle interior cooling modules pump 110. Similarly, at least one outside heat exchanger 120 is in fluid communication with the cold fluid chamber or evaporator reservoir 100 by way of at least one cold fluid chamber to outside heat exchanger line 116 and at least one outside heat exchanger to cold fluid chamber return line 122. Working fluid may be selectively circulated between the cold fluid chamber or evaporator reservoir 100 and the at least one outside heat exchanger 120 using a cold fluid chamber to outside heat exchanger pump 118.

A battery package 608 may be a drive train battery unit used to supply an electric traction motor (not shown) in an electric or hybrid electric vehicle, or may be a battery package fully or partially dedicated to the climate control system 50 in an electric vehicle, hybrid electric vehicle, conventionally powered commercial vehicle, or recreational vehicle. The battery package 608 provides power by way of a battery output 614, which is connected to the heat pump refrigerant compressor 200 of the heat pump 50 (connection not shown). The battery package 608 may also provide power to the vehicle interior cooling module 114 and its cold fluid chamber to vehicle interior cooling module pump 110, to the outside heat exchanger 120, if applicable, and its cold fluid chamber to outside heat exchanger pump 118, to the at least one cabin heat exchanger 310 and its hot fluid chamber to cabin heat exchanger pump 308, and to the outside heat exchanger 326 and its hot fluid chamber to outside heat exchanger pump 324.

A charging system 606 selectively connects the battery package 608 to a shore power source 600 by way of a shore power line 602 as needed for recharging. The battery package 608 may, as a non-limiting example, be a 48 Volts DC battery package, and may additionally be charged by an engine driven electrical generator (not shown) in an embodiment utilized in a conventionally powered vehicle. Further, the battery package 608 may receive power from waste energy recovery, such as from regenerative braking or thermally sourced waste heat reclamation from exhaust or from engine coolant. If the battery package 608 is not itself a drive train battery unit used to supply an electric traction motor (not shown) in an electric or hybrid electric vehicle, then the battery package 608 may receive power from a drive train battery unit.

Each of the heat pump refrigerant compressor 200, the cold fluid chamber to vehicle interior cooling modules pump 110, the hot fluid chamber to cabin heat exchanger pump 308, the hot fluid chamber to outside heat exchanger pump 324, and the cold fluid chamber to outside heat exchanger pump 118 are connected to and controlled directly or indirectly by a system controller 12 by way of at least one system controller output 20 (connections not shown). In order to properly manage the climate control system 10, the cold fluid chamber or evaporator reservoir 100 is provided with a cold fluid chamber temperature sensor 106, and the hot fluid chamber or condenser reservoir 300 is provided with a hot fluid chamber temperature sensor 304, which are connected to the system controller 12 by way of temperature inputs 14 (connection not shown).

An engine coolant supply line 400 and an engine coolant return line 402 may be arranged to selectively circulate heated engine coolant between a vehicle engine, if applicable, and the hot fluid chamber or condenser reservoir 300. Alternately, the supply line 400 and the return line 402 may be arranged to selectively circulate heated fluid obtained from other sources of waste heat, such as thermally sourced waste heat from engine exhaust, if applicable, or from the battery package 608 or other battery unit (not shown). In the case of an electric bus, a coolant filled tank may be substituted for engine coolant from an internal combustion engine, and a heat exchanger added for heat exchange with the external environment. Additionally, super-heated fluid is provided by way of a super-heated fluid supply line 510, which super-heated fluid transfers heat to the working fluid within the cold fluid chamber or evaporator reservoir 100 by way of a super-heated fluid to cold fluid chamber heat exchanger 514, before returning to its source by way of a super-heated fluid return line 516. In some embodiments of the climate control system 10, an electrically controlled variable orifice valve 512 may be provided at the inlet of the super-heated fluid to cold fluid chamber heat exchanger 514.

Figure 2:
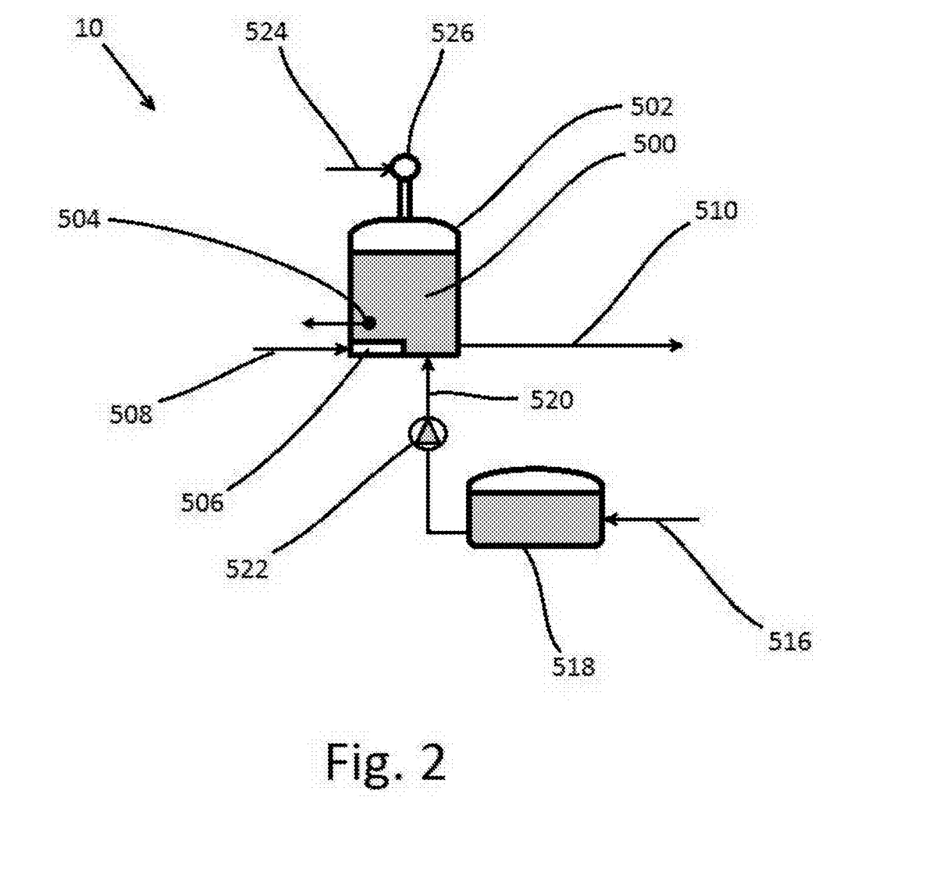
FIG. 2 is a graphical representation of an embodiment of a Vehicle Engine-Off Heating and Cooling Climate Control using Super-Heated Fluid for Heating, as described herein.

Referring now to FIG. 2, a graphical representation of the components of the climate control system 10 used to provide super-heated fluid to the super-heated fluid to cold fluid chamber heat exchanger 514 is shown. A super-heated fluid pressure vessel 502 is pressurized by a compressed air supply line 524, which is regulated by a pressure regulator 526. The super-heated fluid pressure vessel 502 contains an electric heating element 506 connected to an electrical supply 508, and is used to raise the temperature of the super-heated fluid 500. A super-heated fluid pressure vessel temperature sensor 504 provides a signal to the system controller 12 indicating the temperature of the super-heated fluid 500. In this way, the system controller 12 can regulate the pressure regulator 526 and the electric heating element 506 in order to establish and hold the temperature and pressure of the super-heated fluid 500 within the super-heated fluid pressure vessel 502.

The super-heated fluid supply line 510 in FIG. 2 is the same super-heated fluid supply line 510 shown in FIG. 1, and operates to conduct super-heated fluid 500 to the super-heated fluid to cold fluid chamber heat exchanger 514 within the cold fluid chamber or evaporator reservoir 100 by way of the electrically controlled variable orifice delivery valve 512. After the super-heated fluid 500 transfers its heat to the working fluid in the cold fluid chamber or evaporator reservoir 100, it returns to a super-heated fluid return reservoir 518, by way of the super-heated fluid return line 516, which is also the same super-heated fluid return line 516 that appears in FIG. 2. A super-heated fluid positive displacement pump 522, also under the control of the system controller 12 then returns the super-heated fluid 500 to the super-heated fluid pressure vessel 502 by way of a reservoir to pressure vessel return line 520.

As shown in FIG. 1, the embodiment of the climate control system 10 is configured for vehicle cabin heating use under low ambient temperatures. The heat pump refrigerant compressor 200 may be running, thereby pumping heat from the evaporator heat exchanger 102 to the condenser heat exchanger 302, cooling the working fluid in the cold fluid chamber or evaporator reservoir 100, and heating the working fluid in the hot fluid chamber or condenser reservoir 300. The at least one hot fluid chamber to cabin heat exchanger pump 308 may be active, using the heated working fluid in the hot fluid chamber or condenser reservoir 300 passing through the at least one cabin heat exchanger 310 to heat the interior of the vehicle and/or to defrost the vehicle windows. The cold fluid chamber to vehicle interior cooling modules pump 110 and the hot fluid chamber to outside heat exchanger pump 324 remain inactive.

In order to extract heat from the ambient environment under certain conditions and raise the COP of the heat pump 50, an outside heat exchanger 120 is in fluid communication with the cold fluid chamber or evaporator reservoir 100 by way of a cold fluid chamber to outside heat exchanger line 116 and an outside heat exchanger to cold fluid chamber return line 122. A cold fluid chamber to outside heat exchanger pump 118 circulates working fluid between the outside heat exchanger 120 and the cold fluid chamber or evaporator reservoir 100, thereby raising the temperature of the evaporator heat exchanger 102. This increases boiling of refrigerant in the evaporator heat exchanger 102 and increases the efficiency of the heat pump 50. The certain conditions under which the outside heat exchanger 120 may be used to extract heat from the ambient environment may occur when the outside or ambient air temperatures are equal to or greater than approximately 40 degrees Fahrenheit and may further extend up to equal to or lesser than approximately 60 degrees Fahrenheit. Specifically, this range of outside or ambient air temperatures may include the temperatures wherein the COP of the heat pump 50 would be greater than approximately 3.0. Therefore, in this arrangement the embodiment of the climate control system 10 heat energy is recovered from the ambient air by way of the outside heat exchanger 120.

In order to further raise the COP of the heat pump 50, heated engine coolant may be circulated between the vehicle engine and the hot fluid chamber or condenser reservoir 30, or between other sources of waste heat, such as thermally sourced waste heat from engine exhaust or from the battery package 608, using the engine coolant supply line 400 and an engine coolant return line 402, as noted previously. Additionally, the super-heated fluid pressure vessel 502 raises the COP of the heat pump 50 even further by providing more heat to the cold fluid chamber or evaporator reservoir 100 by way of super-heated fluid 500 heated by the electric heating element 506, which super-heated fluid 500 is then passed through the super-heated fluid to cold fluid chamber heat exchanger 514. This further increases boiling of refrigerant in the evaporator heat exchanger 102 to increase the efficiency of the heat pump 50. The super-heated fluid 500 is provided by the super-heated fluid pressure vessel 502 by way of the super-heated fluid supply line 510, and returns to the super-heated fluid return reservoir 518 by way of the super-heated fluid return line 516, as noted previously. The electric heating element 506 may be connected to and draw its power from either or both of the shore power source 600 and the battery package 608. In some embodiments of the climate control system 10, an electrically controlled variable orifice valve 512 may be provided at the inlet of the super-heated fluid to cold fluid chamber heat exchanger 514.

In this configuration, the embodiment of the climate control system 10 reduces overall power consumption of the climate control system 10 when in the heating mode, and preserve the state of charge of the drive train battery unit 608. As before, by warming the cold fluid chamber or evaporator reservoir 100 with super-heated fluid 500 from the super-heated fluid pressure vessel 502, boiling of refrigerant in the evaporator heat exchanger 102 is increased, and the heat pump 50 of the climate control system 10 maintains a COP of greater than one, despite the fact that the electric heating element 506 itself only has a COP of one. The increased efficiency of the heat pump 50 delivers a higher COP and further reduces overall power consumption of the climate control system 10 and helps to preserve the state of charge of the drive train battery unit 608.

Figure 3:
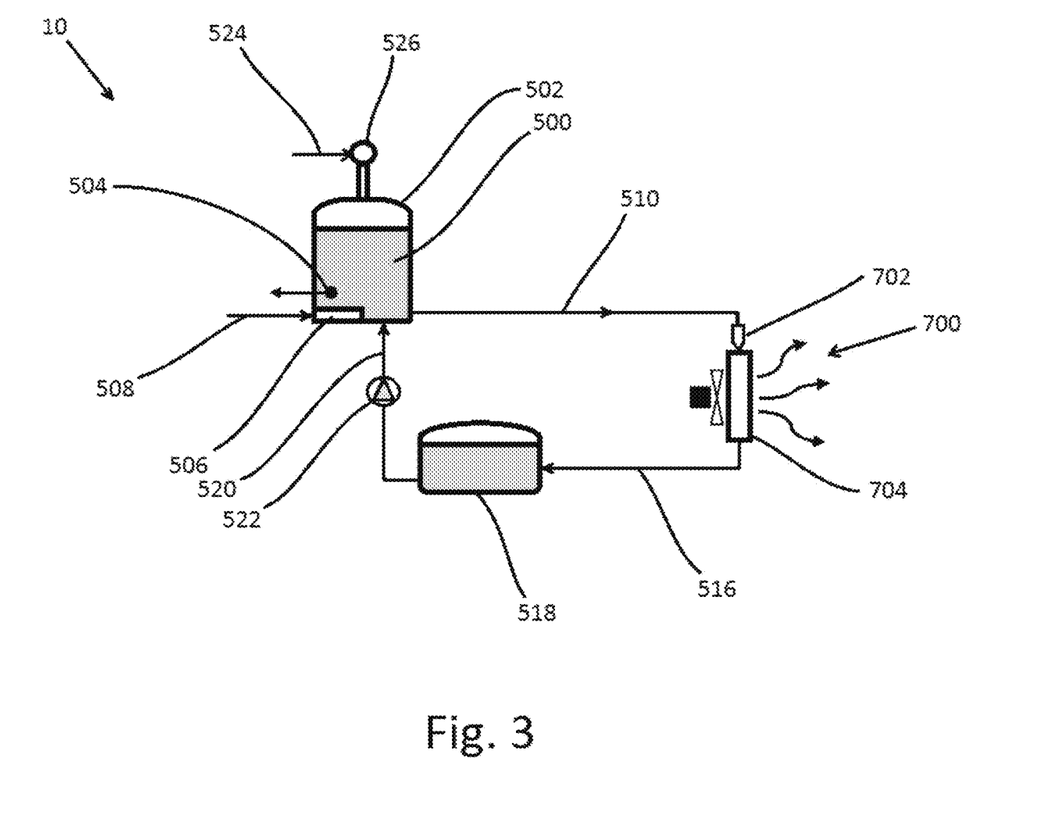
FIG. 3 is a graphical representation of an embodiment of a Vehicle Engine-Off Heating and Cooling Climate Control using Super-Heated Fluid for Heating, as described herein.

Referring now to FIG. 3, a graphical representation of the components of an embodiment of the climate control system 10 used to provide super-heated fluid to directly heat the vehicle interior is shown. A super-heated fluid pressure vessel 502 is again pressurized by a compressed air supply line 524, which is regulated by a pressure regulator 526. The super-heated fluid pressure vessel 502 contains an electric heating element 506 connected to an electrical supply 508, and is used to raise the temperature of the super-heated fluid 500. A super-heated fluid pressure vessel temperature sensor 504 provides a signal to the system controller 12 indicating the temperature of the super-heated fluid 500. In this way, the system controller 12 can regulate the pressure regulator 526 and the electric heating element 506 in order to establish and hold the temperature and pressure of the super-heated fluid 500 within the super-heated fluid pressure vessel 502.

The super-heated fluid supply line 510 in FIG. 3 now operates to conduct super-heated fluid 500 to at least one stand-alone heating unit 700 by way of an electrically controlled variable orifice delivery valve 702. The super-heated fluid 500 transfers its heat to the interior of the vehicle by way of at least one stand-alone heat exchanger 704, and then returns to a super-heated fluid return reservoir 518, by way of the super-heated fluid return line 516. A super-heated fluid positive displacement pump 522, also under the control of the system controller 12, then returns the super-heated fluid 500 to the super-heated fluid pressure vessel 502 by way of a reservoir to pressure vessel return line 520.

Figure 4:
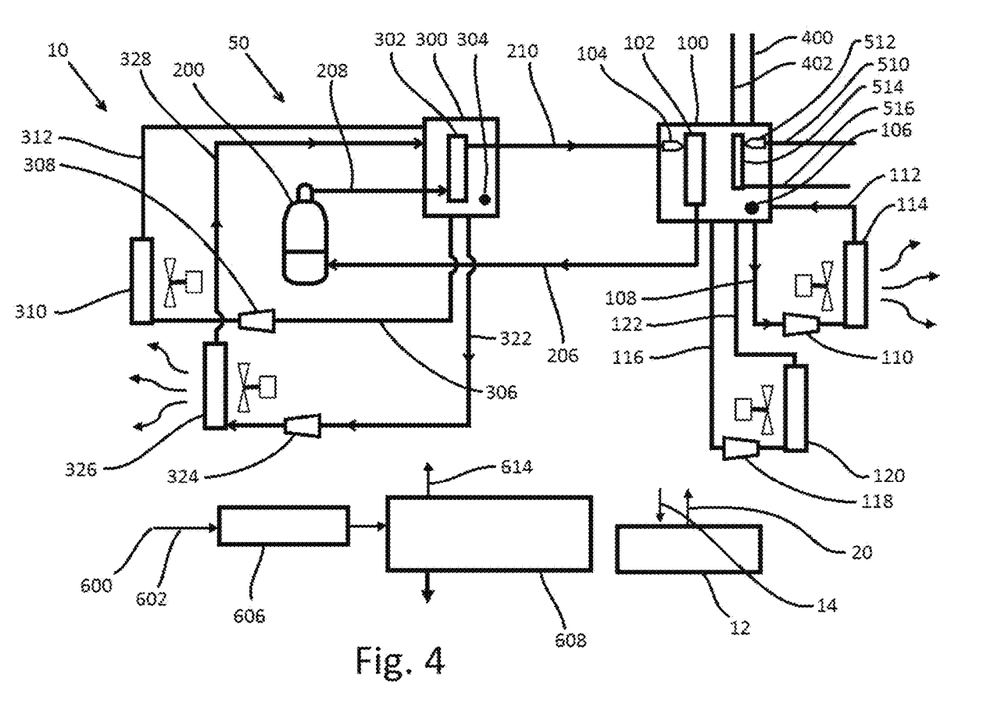
FIG. 4 is a graphical representation of an embodiment of a Vehicle Engine-Off Heating and Cooling Climate Control using Super-Heated Fluid for Heating, as described herein.

Turning now to FIG. 4, a graphical representation of another embodiment of a Vehicle Engine-Off Heating and Cooling Climate Control using Super-Heated Fluid for Heating is shown. A vehicle (not shown) again includes a climate control system 10 using a heat pump 50. The heat pump 50 again includes a heat pump refrigerant compressor 200, a condenser heat exchanger 302, an expansion valve 104, and an evaporator heat exchanger 102. The heat pump refrigerant compressor 200 may again be a 48-volt DC electric scroll compressor. The heat pump refrigerant compressor 200 again discharges compressed gaseous refrigerant to the condenser heat exchanger 302 by way of a refrigerant discharge line 208. The compressed gaseous refrigerant again condenses and rejects heat to the working fluid in a hot fluid chamber or condenser reservoir 300 using the condenser heat exchanger 302, and then proceeds to the expansion valve 104 by way of the refrigerant liquid line 210. After passing through the expansion valve 104, the refrigerant again boils and absorbs heat from the working fluid in a cold fluid chamber or evaporator reservoir 100 using the evaporator heat exchanger 102, before returning to the VFD heat pump refrigerant compressor 200 by way of the refrigerant suction line 206.

At least one cabin heat exchanger 310 is again in fluid communication with the hot fluid chamber or condenser reservoir 300 by way of at least one hot fluid chamber to cabin heat exchanger line 306 and at least one cabin heat exchanger to hot fluid chamber return line 312. Working fluid may again be selectively circulated between the hot fluid chamber or condenser reservoir 300 and the at least one cabin heat exchanger 310 using a hot fluid chamber to cabin heat exchanger pump 308. At least one outside heat exchanger 326 is again in fluid communication with the hot fluid chamber or condenser reservoir 300 by way of at least one hot fluid chamber to outside heat exchanger line 322 and at least one outside heat exchanger to hot fluid chamber return line 328. Working fluid may again be selectively circulated between the hot fluid chamber or condenser reservoir 300 and the at least one outside heat exchanger 326 using a hot fluid chamber to outside heat exchanger pump 324.

As before, at least one vehicle interior cooling module 114 is in fluid communication with the cold fluid chamber or evaporator reservoir 100 by way of at least one cold fluid chamber to vehicle interior cooling modules line 108 and at least one vehicle interior cooling modules to cold fluid chamber return line 112. Working fluid may again be selectively circulated between the cold fluid chamber or evaporator reservoir 100 and the at least one vehicle interior cooling module 114 using a cold fluid chamber to vehicle interior cooling modules pump 110. Similarly, at least one outside heat exchanger 120 is in fluid communication with the cold fluid chamber or evaporator reservoir 100 by way of at least one cold fluid chamber to outside heat exchanger line 116 and at least one outside heat exchanger to cold fluid chamber return line 122. Working fluid may be selectively circulated between the cold fluid chamber or evaporator reservoir 100 and the at least one outside heat exchanger 120 using a cold fluid chamber to outside heat exchanger pump 118.

As before, a battery package 608 may be a drive train battery unit used to supply an electric traction motor (not shown) in an electric or hybrid electric vehicle, or may be a battery package partially or wholly dedicated to the climate control system 50 in an electric vehicle, hybrid electric vehicle, conventionally powered commercial vehicle, or recreational vehicle. The battery package 608 provides power by way of a battery output 614, which is connected to the heat pump refrigerant compressor 200 of the heat pump 50 (connection not shown). The battery package 608 may also provide power to the vehicle interior cooling module 114 and its cold fluid chamber to vehicle interior cooling module pump 110, to the outside heat exchanger 120, if applicable, and its cold fluid chamber to outside heat exchanger pump 118, to the at least one cabin heat exchanger 310 and its hot fluid chamber to cabin heat exchanger pump 308, and to the outside heat exchanger 326 and its hot fluid chamber to outside heat exchanger pump 324.

A charging system 606 selectively connects the battery package 608 to a shore power source 600 by way of a shore power line 602 as needed for recharging. The battery package 608 may, as a non-limiting example, be a 48 Volts DC battery package, and may additionally be charged by an engine driven electrical generator (not shown) in an embodiment utilized in a conventionally powered vehicle. Further, the battery package 608 may receive power from waste energy recovery, such as from regenerative braking or thermally sourced waste heat reclamation from exhaust or from engine coolant. If the battery package 608 is not itself a drive train battery unit used to supply an electric traction motor (not shown) in an electric or hybrid electric vehicle, then the battery package 608 may receive power from such a drive train battery unit.

Each of the heat pump refrigerant compressor 200, the cold fluid chamber to vehicle interior cooling modules pump 110, the hot fluid chamber to cabin heat exchanger pump 308, the hot fluid chamber to outside heat exchanger pump 324, and the cold fluid chamber to outside heat exchanger pump 118 are again connected to and controlled directly or indirectly by a system controller 12 by way of at least one system controller output 20 (connections not shown). In order to properly manage the climate control system 10, the cold fluid chamber or evaporator reservoir 100 is provided with a cold fluid chamber temperature sensor 106, and the hot fluid chamber or condenser reservoir 300 is provided with a hot fluid chamber temperature sensor 304, which are connected to the system controller 12 by way of temperature inputs 14 (connection not shown).

An engine coolant supply line 400 and an engine coolant return line 402 may be arranged to selectively circulate heated engine coolant between a vehicle engine, if applicable, and the hot fluid chamber or condenser reservoir 300. Alternately, the supply line 400 and the return line 402 may be arranged to selectively circulate heated fluid obtained from other sources of waste heat, such as thermally sourced waste heat from engine exhaust, if applicable, or from the battery package 608 or other battery unit (not shown). Additionally, super-heated fluid may be provided by way of a super-heated fluid supply line 510, which super-heated fluid transfers heat to the working fluid within the cold fluid chamber or evaporator reservoir 100 by way of a super-heated fluid to cold fluid chamber heat exchanger 514, before returning to its source by way of a super-heated fluid return line 516. In some embodiments of the climate control system 10, an electrically controlled variable orifice valve 512 may be provided at the inlet of the super-heated fluid to cold fluid chamber heat exchanger 514.

As shown in FIG. 4, the climate control system 10 is now configured for use with the vehicle drivetrain operating under high ambient temperatures. The heat pump refrigerant compressor 200 may again be running, thereby pumping heat from the evaporator heat exchanger 102 to the condenser heat exchanger 302, cooling the working fluid in the cold fluid chamber or evaporator reservoir 100 and heating the working fluid in the hot fluid chamber or condenser reservoir 300. The cold fluid chamber to vehicle interior cooling modules pump 110 may be active, using the cooled working fluid in the cold fluid chamber or evaporator reservoir 100 passing through the at least one vehicle interior cooling module 114 to cool the interior of the vehicle. The at least one hot fluid chamber to cabin heat exchanger pump 308 is inactive. The hot fluid chamber to outside heat exchanger pump 324 is active so that the at least one outside heat exchanger 326 rejects heat from the working fluid of the hot fluid chamber or condenser reservoir 300 to ambient. The cold fluid chamber to outside heat exchanger pump 118, the engine coolant supply line 400, the electric heating element 506, the super-heated fluid positive displacement pump 522, and the super-heated fluid supply line 510 remain inactive.

While the Vehicle Engine-Off Heating and Cooling Climate Control using Super-Heated Fluid for Heating, and methods for the use thereof, has been described with respect to at least one embodiment, the system and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having a climate control system, comprising:
  a super-heated fluid pressure vessel;
  an electric heating element within the super-heated fluid pressure vessel;
  at least one heat exchanger in fluid communication with the super-heated fluid pressure vessel;
  an electrically controlled variable delivery valve configured to control the flow of super-heated fluid from the super-heated fluid pressure vessel to the at least one heat exchanger;
  a super-heated fluid return reservoir in fluid communication with the at least one heat exchanger and with the super-heated fluid pressure vessel; and a positive displacement pump configured to pump fluid from the super-heated fluid return reservoir to the super-heated fluid pressure vessel.

2. The vehicle of claim 1, further comprising:
a compressed air supply line having a pressure regulator in fluid communication with the super-heated fluid pressure vessel.

3. The vehicle of claim 1, wherein:
the at least one heat exchanger further comprises at least one cabin heat exchanger.

4. The vehicle of claim 1, further comprising:
a heat pump having a refrigerant compressor, a condenser heat exchanger, an expansion valve, and an evaporator heat exchanger;
the condenser heat exchanger exchanging heat between refrigerant and working fluid within a hot fluid chamber;
the evaporator heat exchanger exchanging heat between refrigerant and working fluid within a cold fluid chamber; and
wherein the at least one heat exchanger further comprises a super-heated fluid to cold fluid chamber heat exchanger located within the cold fluid chamber and configured to exchange heat between the super-heated fluid from the super-heated fluid pressure vessel and the working fluid within the cold fluid chamber.

5. The vehicle of claim 4, wherein:
the hot fluid chamber is selectively in fluid communication with at least one of:
at least one cabin heat exchanger, and
at least one hot fluid chamber to outside air heat exchanger.

6. The vehicle of claim 5, wherein:
the cold fluid chamber is selectively in fluid communication with at least one of:
at least one vehicle interior cooling module, and
at least one cold fluid chamber to outside heat exchanger.

7. The vehicle of claim 6, further comprising:
at least one fluid supply line and at least one fluid return line in fluid communication with the cold fluid chamber and with a waste heat source.

8. The vehicle of claim 6, further comprising:
a system controller connected to at least one of:
the refrigerant compressor,
a hot fluid chamber to cabin heat exchanger pump arranged to circulate working fluid between the hot fluid chamber and the at least one cabin heat exchanger,
a hot fluid chamber to outside heat exchanger pump arranged to circulate working fluid between the hot fluid chamber and the at least one hot fluid chamber to outside heat exchanger,
a cold fluid chamber to vehicle interior cooling module pump arranged to circulate working fluid between the cold fluid chamber and the at least one vehicle interior cooling module,
a cold fluid chamber to outside heat exchanger pump arranged to circulate working fluid between the cold fluid chamber and the cold fluid chamber to outside heat exchanger,
the electrically controlled variable delivery valve,
the positive displacement pump, and
the electric heating element;
the system controller being further configured to cause the climate control system to at least one of:

heat the vehicle interior by circulating super-heated fluid between the super-heated fluid pressure vessel and the super-heated fluid to cold fluid chamber heat exchanger located within the cold fluid chamber, pump heat from the cold fluid chamber to the hot fluid chamber using the heat pump, and circulate working fluid between the hot fluid chamber and the at least one cabin heat exchanger, heat the vehicle interior by circulating working fluid between the cold fluid chamber and the at least one cold fluid chamber to outside heat exchanger, pump heat from the cold fluid chamber to the hot fluid chamber using the heat pump, and circulate working fluid between the hot fluid chamber and the at least one cabin heat exchanger, and cool the vehicle interior by circulating working fluid between the cold fluid chamber and the at least one vehicle interior cooling module, pump heat from the cold fluid chamber to the hot fluid chamber using the heat pump, and circulate working fluid between the hot fluid chamber and the at least one hot fluid chamber to outside air heat exchanger.

9. A climate control system of a vehicle, comprising:
a super-heated fluid pressure vessel;
an electric heating element within the super-heated fluid pressure vessel;
at least one heat exchanger in fluid communication with the super-heated fluid pressure vessel;
an electrically controlled variable delivery valve configured to control the flow of super-heated fluid from the super-heated fluid pressure vessel to the at least one heat exchanger;
a super-heated fluid return reservoir in fluid communication with the at least one heat exchanger and with the super-heated fluid pressure vessel; and
a positive displacement pump configured to pump fluid from the super-heated fluid return reservoir to the super-heated fluid pressure vessel.

10. The climate control system of claim 9, further comprising:
a compressed air supply line having a pressure regulator in fluid communication with the super-heated fluid pressure vessel.

11. The climate control system of claim 9, wherein:
the at least one heat exchanger further comprises at least one cabin heat exchanger.

12. The climate control system of claim 9, further comprising:
a heat pump having a refrigerant compressor, a condenser heat exchanger, an expansion valve, and an evaporator heat exchanger;
the condenser heat exchanger exchanging heat between refrigerant and working fluid within a hot fluid chamber;
the evaporator heat exchanger exchanging heat between refrigerant and working fluid within a cold fluid chamber; and
wherein the at least one heat exchanger further comprises a super-heated fluid to cold fluid chamber heat exchanger located within the cold fluid chamber and configured to exchange heat between the super-heated fluid from the super-heated fluid pressure vessel and the working fluid within the cold fluid chamber.

13. The climate control system of claim 12, wherein:
the hot fluid chamber is selectively in fluid communication with at least one of:
at least one cabin heat exchanger, and
at least one hot fluid chamber to outside air heat exchanger.

14. The climate control system of claim 13, wherein:
the cold fluid chamber is selectively in fluid communication with at least one of:
at least one vehicle interior cooling module, and
at least one cold fluid chamber to outside heat exchanger.

15. The climate control system of claim 14, further comprising:
at least one fluid supply line and at least one fluid return line in fluid communication with the cold fluid chamber and with a waste heat source.

16. The climate control system of claim 14, further comprising:
a system controller connected to at least one of:
the refrigerant compressor,
a hot fluid chamber to cabin heat exchanger pump arranged to circulate working fluid between the hot fluid chamber and the at least one cabin heat exchanger,
a hot fluid chamber to outside heat exchanger pump arranged to circulate working fluid between the hot fluid chamber and the at least one hot fluid chamber to outside heat exchanger,
a cold fluid chamber to vehicle interior cooling module pump arranged to circulate working fluid between the cold fluid chamber and the at least one vehicle interior cooling module,
a cold fluid chamber to outside heat exchanger pump arranged to circulate working fluid between the cold fluid chamber and the cold fluid chamber to outside heat exchanger,
the electrically controlled variable delivery valve,
the positive displacement pump, and
the electric heating element;
the system controller being further configured to cause the climate control system to at least one of:
heat the vehicle interior by circulating super-heated fluid between the super-heated fluid pressure vessel and the super-heated fluid to cold fluid chamber heat exchanger located within the cold fluid chamber, pump heat from the cold fluid chamber to the hot fluid chamber using the heat pump, and circulate working fluid between the hot fluid chamber and the at least one cabin heat exchanger,
heat the vehicle interior by circulating working fluid between the cold fluid chamber and the at least one cold fluid chamber to outside heat exchanger, pump heat from the cold fluid chamber to the hot fluid chamber using the heat pump, and circulate working fluid between the hot fluid chamber and the at least one cabin heat exchanger, and
cool the vehicle interior by circulating working fluid between the cold fluid chamber and the at least one vehicle interior cooling module, pump heat from the cold fluid chamber to the hot fluid chamber using the heat pump, and circulate working fluid between the hot fluid chamber and the at least one hot fluid chamber to outside air heat exchanger.

17. A method of providing climate control in an occupant compartment of a vehicle, comprising the steps of:
selectively heating the occupant compartment by:
super-heating fluid in a pressure vessel using an electric heating element;
exchanging heat between the super-heated fluid and working fluid in a cold fluid chamber;
pumping heat from the working fluid in the cold fluid chamber to working fluid in a hot fluid chamber; and
circulating the working fluid between the hot fluid chamber and at least one cabin heat exchanger.

18. The method of claim 17, further comprising the steps of:
further selectively heating the occupant compartment by extracting heat from the ambient environment by circulating working fluid between the cold fluid chamber and at least one cold fluid chamber to outside heat exchanger.

19. The method of claim 17, further comprising the steps of:
further selectively heating the occupant compartment by recovering heat from a waste heat source by circulating working fluid between the cold fluid chamber and the waste heat source.

20. The method of claim 17, further comprising the steps of:
selectively cooling the occupant compartment by:
circulating the working fluid between the cold fluid chamber and at least one vehicle interior cooling module;
pumping heat from the working fluid in the cold fluid chamber to working fluid in a hot fluid chamber; and
circulating the working fluid between the hot fluid chamber and at least one hot fluid chamber to outside air heat exchanger.

* * * * *

UNITED STATES PATENT AND TRADEMARK OFFICE
CERTIFICATE OF CORRECTION

Page 1 of 1

PATENT NO. : 10,836,236 B2
APPLICATION NO. : 16/203028
DATED : November 17, 2020
INVENTOR(S) : Larson et al.

It is certified that error appears in the above-identified patent and that said Letters Patent is hereby corrected as shown below:

In the Specification

On Column 1, Line 4, before the "BACKGROUND", please insert the following paragraph:
-- STATEMENT REGARDING FEDERALLY SPONSORED RESEARCH OR DEVELOPMENT
This invention was made with government support under DE-EE0007767 awarded by the U.S. Department of Energy. The Government therefore has certain rights in the invention. --

Signed and Sealed this
Seventh Day of February, 2023

Katherine Kelly Vidal
*Director of the United States Patent and Trademark Office*